Sept. 27, 1966   R. M. E. PETIT   3,275,105
SHOE FOR SPOT TYPE DISC BRAKE
Original Filed Sept. 5, 1963   2 Sheets-Sheet 1
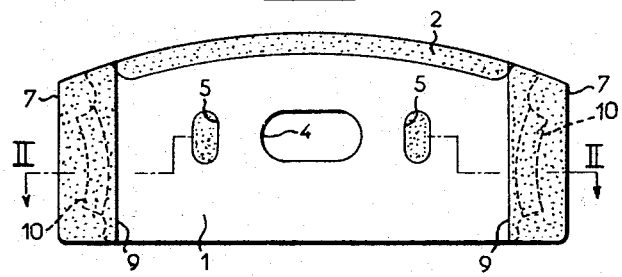
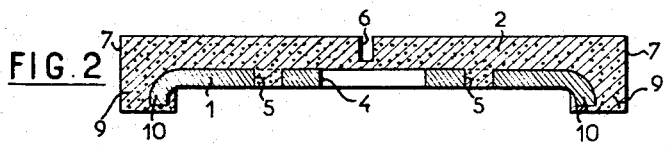
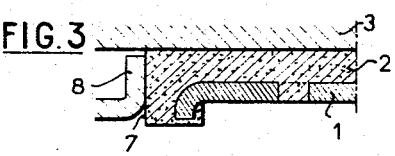 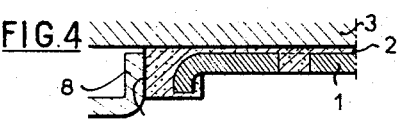
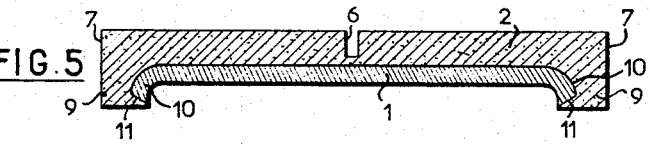
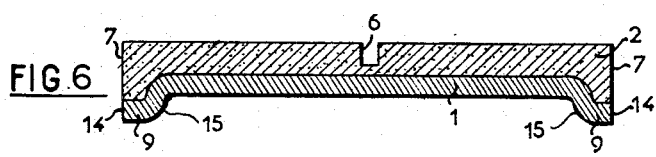
INVENTOR
ROBERT MAXIME EUGENE PETIT
By Irwin A. Thompson
ATTY.

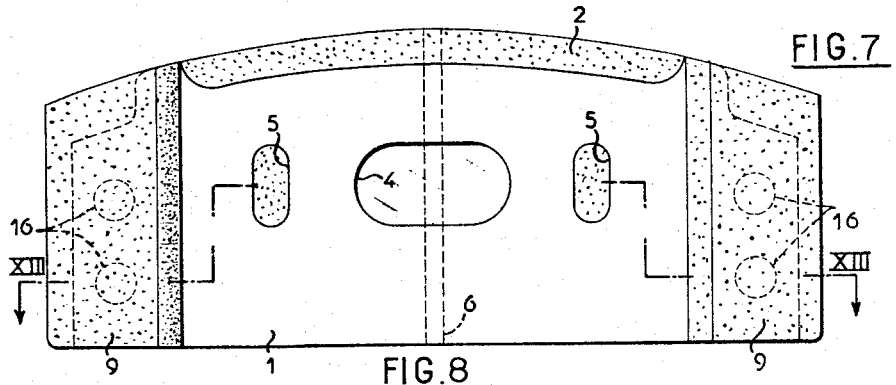
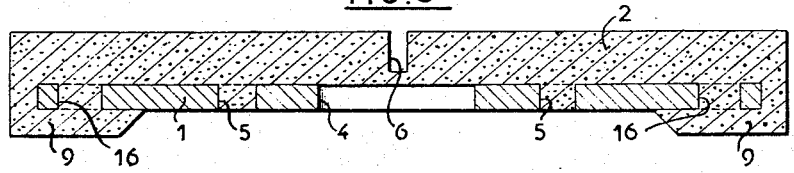
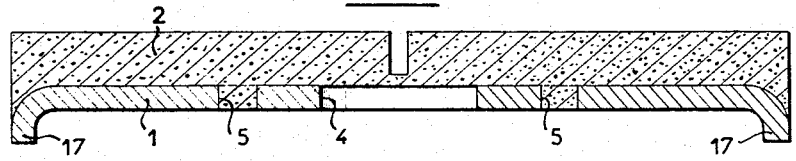
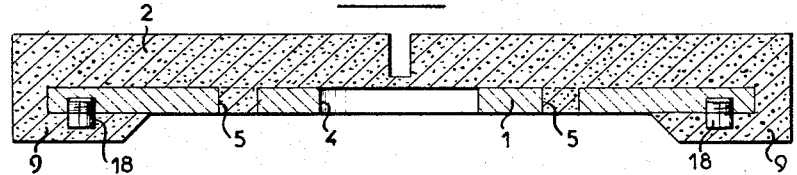
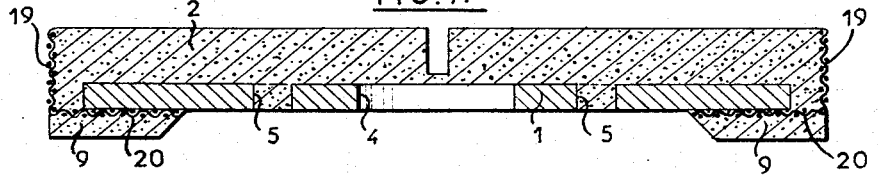

United States Patent Office 3,275,105
Patented Sept. 27, 1966

3,275,105
SHOE FOR SPOT TYPE DISC BRAKE
Robert Maxime Eugene Petit, Saint-Mande, France, assignor to Societe Anonyme Francaise du Ferodo, Paris, France, a corporation of France
Continuation of application Ser. No. 306,834, Sept. 5, 1963. This application May 14, 1965, Ser. No. 465,815
Claims priority, application France, Sept. 15, 1962, 909,604, Patent 1,340,988
1 Claim. (Cl. 188—250)

This application is a continuation of application Serial No. 306,834, filed September 5, 1963, and now abandoned.

The present invention relates to a friction shoe for a disc brake, comprising a support, for example of metal, and a friction lining on one face of the support, the said lining coming at the moment of braking into frictional contact with the disc, due to the effect of action or reaction forces applied to the said support transversely to the said shoe, while the shoe which furthermore tends to be driven longitudinally by the rotation of the disc comes into contact by one of its outer sides with a fixed abutment of the brake.

Brake shoes are generally so constructed that the height of the material which can cooperate with the fixed member of the brake is equal to the thickness of the lining itself (thickness of material subject to wear), increased by the thickness of the metal support.

The height of the bearing surface which actually participates in this abutment work is furthermore always less than this maximum height, even in the new condition. A certain clearance must in fact be provided between the disc and the part of the brake which serves as an abutment.

During the course of use, this height constantly diminishes as the thickness of the lining is reduced by wear, and it may happen that the supporting surface on the fixed member becomes weak enough for the thrust forces to exceed the value permissible for the lining, especially if no particular precautions are taken so that the strength of the lining is greater in this zone. Accidents which may result from this can be serious.

The present invention has for its object a friction shoe for a disc brake which is free from these drawbacks, and the operation of which is satisfactory irrespective of the state of wear of the lining.

According to the invention, at least one of the outer sides of the shoe which is applied against the abutment has its application surface reinforced in extent and/or in strength in such manner that the said surface remains adequate even after an almost complete wearing down of the lining has reduced its extent.

In one form of construction, the thickness of the lining cooperating with the abutment on the fixed support is greater than the sum of the thicknesses of the metal support and the thickness proper of the lining which is subject to wear.

Thus, even after the lining is worn down, the height of the edge coming into abutment against the support remains equal to the height of the said support, maintaining the crushing stresses unchanged.

The added thickness of lining is preferably supported on a metal portion. This metal supporting portion may be added by welding to the metal support.

It may be constituted by parts of the support formed as projections by punching.

It may be constituted by a transverse projection created by stamping and cutting out from the metal support.

It is preferably formed by an edge provided at the extremity of the metal plate, this edge being straight or of arcuate form.

Advantageously also, the lining is hooked over the extremity of this edge which it may or may not enclose. Advantage may be taken of the forming operation carried out to produce this edge in order to form projections which reinforce the resistance of the plate to the bending stresses which occur during operation.

The preceding condition of anchorage of the lining can advantageously be satisfied by a single press operation on the material to be molded, folding back the lining around the edge. It is found in an advantageous manner that during the course of molding, the density of the lining tends to be higher in the portion surrounding the edge of the support, which is favorable to its strength.

When so required, the attachment of the lining on the inclined underlying metal surfaces may be increased by stippling carried out with a diamond-pointed tool.

In general, the bearing surfaces formed on the lateral faces of the plates and the supporting faces provided on the fixed support are perpendicular to the plane of the disc. According to the invention, it is however contemplated to provide all or part of these bearing surfaces and/or all or part of the supporting faces so that they make a certain angle with the plane of the disc.

In an alternative form, at least one of the lateral faces of the shoe comprises a mixed bearing surface partly composed of lining and partly of metal.

The metal may or may not be the same as that of the metal support.

There may be provided studs of a softer metal than the support fixed in the lining directly above the support, but having a strength greater than that of the lining.

The metal parts are preferably constituted by small tongues of the metal support which are harder than the fixed support of the brake and extending up to the supporting face. It has been found that the portions of lining held in the bearing surface were sufficient to avoid noise. It is possible that this result may be due to a certain hammering of the support which, during the course of wear, enables the action of the lining to be maintained or by an encasing by the lining of the steel bearing surfaces which actually ensure the transmission of the forces and eliminate noise.

In a further alternative form, at least one of the lateral faces of the shoe comprises one or more metal parts recessed in the bearing surface uniformly provided as a lining, these metal parts being preferably constituted by tongues of the metal support embedded in the lining and recessed by an amount slightly greater than the normal compression of the lining after prolonged hammering.

The tongues are preferably shaped so as to maintain in position the pieces of lining which may tend to become detached as a result of cracks.

The action of the tongues then permits the abutment to operate correctly in the event of any accident to the lining, at the price of a sudden noise, if the lining is broken, and without any drawback if the metal-to-metal contact occurred after a normal period of wear, without bursting or cracking.

It is possible to provide simultaneously the arrangements indicated above. For example, the tongues forming extensions of the metal supports and playing the part either of working elements or of safety and anchorage elements may be combined with a greater height of the bearing surfaces provided on at least one lateral face of the plates.

As an alternative, the application surface of the outer side of the shoe is of lining and has its thickness increased by folding back towards the rear, beyond the usual total thickness of the shoe, while the support is flat and comprises at the position of the foldback at least one hole through which the material of the lining passes so as to reinforce the securement of the folded-back portion to the normal portion of the lining.

In a further alternative, each extremity of the support is provided with an edge which constitutes an abutment surface.

As a still further alternative, the application surface of the outer side of the shoe is of lining material and has its thickness increased by folding back towards the rear, beyond the normal total thickness of the shoe, the folded-back portion being consolidated by at least one projection formed on the support. This projection is preferably formed by a stud screwed into the support.

In still another alternative form, the outer side of the shoe is reinforced by a surface lattice work. When a doubling back of the lining is provided, this lattice work can be extended by a portion which is embedded in the folded-back portion.

The particular features and advantages of the invention will further be brought out in the description which follows below of forms of construction selected by way of example, reference being made to the accompanying drawings in which:

FIGURE 1 is a view in elevation of a shoe for a disc brake according to the invention;

FIGURE 2 is a view of this shoe in cross section following the broken line II—II of FIG. 1;

FIGURE 3 shows the shoe in the new condition, in the engaged and abutment position;

FIGURE 4 is similar to FIG. 3 but shows the case where the shoe is in a worn condition;

FIGURE 5 is a view similar to FIG. 2 but comprising a modified detail;

FIGURE 6 is a view in cross section of another alternative construction;

FIGURE 7 is a view in elevation to a larger scale of another alternative construction of shoe;

FIGURE 8 is a view of this other alternative form, in cross section taken along the broken line 8—8 of FIG. 7; and FIGURES 9, 10 and 11 are views similar to that of FIG. 8 but relating respectively to still further alternative constructions.

Reference will first be made to FIGS. 1 to 4. A friction shoe for a disc brake comprises a support 1, for example of metal, and a friction lining 2 on one face of the support 1. The shoe is intended to cooperate in friction by the application of the lining 2 against a disc 3 which is fast for rotation with one wheel of the automobile vehicle. The shoe is provided with one or a number of holes 4 which are formed in the support 1 in order to receive the application of action or reaction forces transverse to the disc 3 for the purposes of braking. In addition, holes 5 are formed in the support 1 and are filled with the friction lining material 2. A slot 6 is formed in the lining 2.

At the moment of braking, the forces of action or reaction applied to the hole 4 of the support 1 transversely to the shoe bring the lining 2 into frictional engagement with the disc 3, while the shoe which tends to be carried away longitudinally by the rotation of the disc 3 comes into application by one of its outer sides 7 against a fixed abutment 8 of the brake.

In accordance with the invention, at least one of the outer sides 7 coming into application against the abutment 8 has its application surface reinforced in extent and/or in strength in such manner that the said surface remains adequate even after an almost complete wearing out of the lining 2 has reduced its extent.

In the example shown in FIGS. 1 to 4, the outer side 7 of the shoe is of friction lining material 2 and has its thickness increased by a turned-back portion 9 beyond the total thickness of the shoe. The support 1 has a curved-back portion 10 in the return 9. The portion 10 is wholly embedded in the lining 2.

When the shoe is in the new state (FIG. 3), the application surface of the side 7 against the abutment 8 permits a perfect longitudinal retention of the shoe. The return 9 can project behind the abutment 8, as shown. When the shoe is worn (FIG. 4) and when the thickness of the lining 2 has become very small, the return 9 moves forward by the amount corresponding to the wear of the lining and assists in its application against the abutment 8 which retains an adequate dimension of application.

In an alternative form shown in FIG. 5, the arrangement is similar to that which has been described with reference to FIGS. 1 to 4, but the curved-back portion 10 of the support 1 is only embedded in the lining 2 of the return 9 on the side of the application surface 7 and is bare on the other side. The extremity 11 of the portion 10 is preferably bevelled in order to reinforce the anchorage of the lining 2 with the support 1 in the zone of the return 9.

In the alternative construction shown in FIG. 6, the arrangements in accordance with FIGS. 1 to 4 or 5 are combined. The side 7 is provided with a turn-back portion 9 so as to retain a sufficient extent of application after wear of the lining 2, and the support 1 is extended at 14 up to the side 7 in order to consolidate the application. An extension 14 of this kind may comprise a further bend 15 so as to transfer rearwards its field of action for application against the abutment 8. The extension 14 may correspond to the whole width of the shoe or part of this width only, for example in a form similar to that of the tongues 12.

Reference will now be made to FIGS. 7 and 8 which relate to a further alternative construction of shoe, in which the support 1 is straight, facing the returns 9 of the lining 2, and comprises at this position holes 16 through which the material of the lining passes in order to reinforce the rigid securement of the returns 9 to the working portion of the lining 2.

In the alternative form shown in FIG. 9, the support 1 is provided at its extremities with edges 17 which constitute metal abutment surfaces.

In the further alternative construction shown in FIG. 10, the lining 2 is provided with the returns 9 and the latter are consolidated by projections 18 formed on the support 1. These projections may, for example, be formed by studs screwed into the said support.

In the case where the lining 2 comprises the return portion 9 (FIG. 11), the lattices 19 are preferably extended by portions 20 arranged in the said returns.

The invention is of course not limited to the forms of construction described and shown, but includes all alternative forms within its scope.

Having described my invention, I claim:

A brake including a brake shoe comprising a support member, a friction lining on one face of the support member, said brake shoe having a central portion and two edges, a fixed abutment, one of said edges contacting said fixed abutment along a contact surface, the thickness of the shoe central portion before wear and the width of said contact surface being substantially equal, said one edge having a thickness substantially greater than the thickness of said central portion whereby said contact surface maintains a substantially constant width as said friction lining wears away.

References Cited by the Examiner

UNITED STATES PATENTS

| | | | |
|---|---|---|---|
| 2,911,074 | 11/1959 | Fraula et al. | 188—251 |
| 3,053,346 | 9/1962 | Butler | 188—73 |
| 3,124,217 | 3/1964 | Butler | 188—73 |
| 3,190,397 | 6/1965 | Sudres | 188—250 X |

FOREIGN PATENTS 1,286,818  1/1962  France.

MILTON BUCHLER, *Primary Examiner.*

G. E. A. HALVOSA, *Assistant Examiner.*